United States Patent [19]

Frazier

[11] 4,433,896
[45] Feb. 28, 1984

[54] COAXIAL OPTICAL FIBER CONNECTOR

[75] Inventor: Gary A. Frazier, Plano, Tex.

[73] Assignee: Texas Instruments Incorporated, Dallas, Tex.

[21] Appl. No.: 308,346

[22] Filed: Oct. 5, 1981

[51] Int. Cl.³ .............................................. G02B 7/26
[52] U.S. Cl. ................................. 350/96.21; 156/158
[58] Field of Search ............. 350/96.15, 96.20, 96.21, 350/96.22; 264/1.5; 156/158

[56] References Cited

U.S. PATENT DOCUMENTS

| 3,734,594 | 5/1973 | Trambarulo | 350/96.21 |
|---|---|---|---|
| 3,846,010 | 11/1974 | Love et al. | 350/96.22 |
| 4,135,779 | 1/1979 | Hudson | 350/96.15 |
| 4,150,870 | 4/1979 | d'Auria | 350/96.20 |
| 4,184,739 | 1/1980 | d'Auria et al. | 350/96.15 |
| 4,264,127 | 4/1981 | Schumacher et al. | 350/96.20 |

FOREIGN PATENT DOCUMENTS

| 2408623 | 9/1975 | Fed. Rep. of Germany | 350/96.21 |
|---|---|---|---|
| 54-151048 | 11/1979 | Japan | 350/96.20 |
| 55-142310 | 11/1980 | Japan | 350/96.21 |
| 55-142309 | 11/1980 | Japan | 350/96.21 |

OTHER PUBLICATIONS

Wielar, Proceedings of the Society of Photo-Optical Instrumentation Engineers Seminar on Fibre Optics Come of Age, vol. 31, San Mateo, California, USA, Oct. 16-17, 1972, "Plastic Optical Fibers", pp. 3-12.

Primary Examiner—John D. Lee
Assistant Examiner—Frank Gonzalez
Attorney, Agent, or Firm—James T. Comfort; Robert O. Groover, III; Melvin Sharp

[57] ABSTRACT

Fiber optic coupler for coupling two mutually isolated optical fibers to a third union fiber rapidly and easily. Two mechanical elements are used, the first one being a hollow cylinder with an inside diameter equal to twice the fiber outside diameter, and the second being a second hollow cylinder with an inside diameter equal to one fiber diameter and an outside diameter equal to twice the fiber diameter. The union fiber is inserted into the smaller cylinder, the two mutually isolated fibers are inserted into the larger cylinder, the empty space in the larger cylinder is filled with an index-matching cement, and the two cylinders are then pushed together. This provides a simple and economical assembly of a coupler which will work for plastic fibers, and does not require any expensive manufacturing steps. Preferably stainless steel is used for the two cylinders.

8 Claims, 2 Drawing Figures

COAXIAL OPTICAL FIBER CONNECTOR

BACKGROUND OF THE INVENTION

The present invention relates to a method for coupling two mutually isolated optical fibers to a third optical fiber.

It would be highly desirable, for a bar code reader, to be able to inexpensively manufacture a coupling which joined two mutually isolated optical fibers to third optical fiber. For example, the two mutually isolated fibers could be connected to a light source and a light detector respectively, and the union fiber could be used both to illuminate and to detect light reflected from a bar code pattern.

Optical couplers fall into two main categories: integrated and discrete. Integrated optical couplers are growths or diffusions into a planar material which act as areas to specifically direct optical information. A three port integrated optical coupler allows optical information to be guided within these diffused or grown "walls". The main disadvantages of these couplers are two-fold. First, the material required to generate these planar structures is of high cost. Secondly, for long path lengths, the ability to pattern the coupler in a plane material becomes very difficult. The solution to this problem has been to couple discrete optical fibers to the planar coupler. The cost incurred in producing a reliable joint between the discrete fibers and the planar coupler is high.

Discrete optical fibers can be coupled in a variety of ways. For example, a bundle of fibers can be inserted into a cup which has a high optical reflectance. In such a case, all light which enters the cup from any or all of the inserted optical fibers will be directed with equal strength back along all of the fibers. Such a design does not allow any two fibers to be optically isolated from each other since all fibers are coupled optically with equal efficiency.

Optical couplers which isolate two fibers, while coupling both to a third fiber, have been made using glass fibers by the use of a heat funsion process. In practice, two fibers are butted endwise against the end of a similar fiber and subsequently heated until a mechanical and optical joint is formed. This technique has the disadvantage that the ends of the optical fibers must be cut and polished before fusing, so that the coupler will have high optical efficiency. This procedure is costly due to the time and equipment required. Furthermore, this process has not been successful when plastic optical fibers are used thereby requiring the use of a fragile glass coupler.

Thus, at present there is no known inexpensive method for joining a mutually isolated pair of optical fibers to a third optical fiber while minimizing the optical loss.

It is thus an object of the present invention to provide a method for inexpensively joining two mutually isolated optical fibers to a third optical fiber while minimizing the optical loss.

It is a further object of the present invention to provide a coupler whereby two mutually isolated optical fibers can be joined to a third optical fiber with minimum loss.

It is a further object of the present invention to provide a method for joining two isolated optical fibers to a third optical fiber with minimum optical loss, without any requirement for polishing the ends of the optical fibers to be joined.

It is a further object of the present invention to provide a method for coupling two mutually isolated optical fibers to a third optical fiber while incurring minimum optical loss, wherein the fibers used may be plastic optical fibers.

It is a further object of the present invention to provide a method for assembling a coupling between two mutually isolated optical fibers and a third optical fiber with minimum loss, which can be rapidly and accurately performed by unskilled workers.

The majority of the optical fiber art has been directed to fibers suitable for high data rates for communications. However the problems presented by such applications are very different from the relevant problems and possibilities in such applications as those to which the present invention is described.

In particular, low loss through the coupling is not an absolute necessity in a system for a barcode reader, but simply an economic factor, since greater loss can be compensated by using a more intense illumination source. By contrast, communications fiber systems are often required to reduce insertion loss to an extremely low level, if a particular system is to be possible at all.

Similarly, the problems of mode conversion, depolarization, etc., which are so important in design of couplers for communications fibers, are of no concern in the present case.

SUMMARY OF THE INVENTION

To achieve these and other objects of the present invention, there is provided a coupling having a male element which retains a union fiber, and a female element which retains two mutually isolated fibers, so that simple assembly of the coupling (preferably filled with transparent cement) positions the fiber ends to achieve the desired optical coupling.

According to the present invention there is provided:
A fiber optic coupler for coupling two mutually isolated fibers to a union fiber, comprising:

a female element generally shaped as a cylindrical shell, said female element comprising an inside diameter which is equal to twice the diameter of one of said mutually isolated fibers, plus clearance; and a male element shaped generally as a cylindrical shell, said male element having an inside diameter which is equal to the diameter of said union fiber plus clearance, and said male element having an outside diameter which is approximately equal to the inside diameter of said female element.

According to the present invention there is also provided:

a method for coupling two mutually isolated optical fibers to a union optical fiber, comprising the steps of:

providing a female element generally shaped as a cylindrical shell, said female element comprising an inside diameter which is equal to twice the diameter of one of said mutually isolated fibers, plus clearance;

providing a male element shaped generally as a cylindrical shell, said male element having an inside diameter which is equal to the diameter of said union fiber plus clearance, and said male element having an outside diameter which is approximately equal to the inside diameter of said female element;

positioning said union fiber within said male from said male element;

positioning said mutually isolated fibers within said female element, so that respective free ends of said mutually isolated fibers protrude from said female element and are approximately adjacent;

filling said female element with translucent glue; and assembling said male element into said female element so that said free end of said union fiber is opposed to said respective free ends of said mutually isolated fibers.

BRIEF DESCRIPTION OF THE DRAWINGS

The present invention will be described with reference to the accompanying figures, wherein.

DESCRIPTION OF THE PREFERRED EMBODIMENTS

Figure 1:
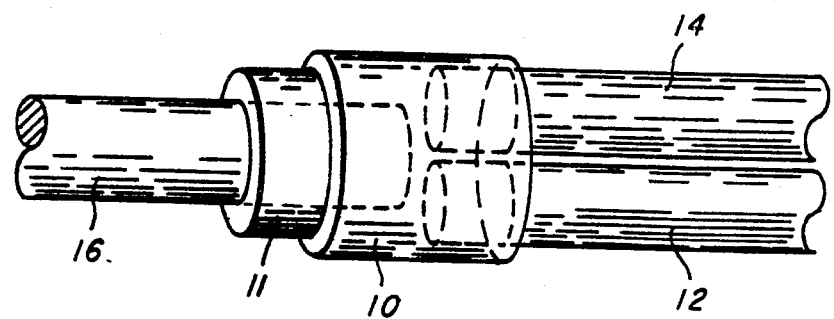
FIG. 1 is a perspective view of a coupling formed by the present invention.
Figure 2:
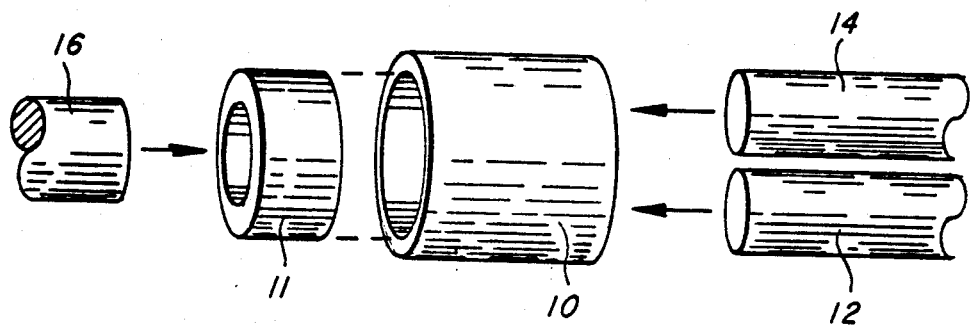
FIG. 2 shows the method of forming an optical connection according to the present invention.

The present invention is preferably applied to the union of three clad plastic optical fibers. FIG. 1 shows the assembled fiber coupler. Union fiber 16 is retained by male element 11, and the two mutually isolated fibers 12 and 14 are retained by female element 10. The inside diameter of element 11 is equal to one fiber diameter (plus clearance), and the inside diameter of element 10 is equal to two fiber diameters plus clearance. The outside diameter of element 11 is approximately equal to the inside diameter of element 10, so that a secure mechanical fit is provided between elements 11 and 10. Thus, element 11 maintains the orientation of fiber 16, and element 10 maintains the orientation of fibers 12 and 14. Since the cavity within element 10 is filled with an approximately index-matching cement (i.e., index-matched to the fiber core), roughness or irregularity at the end of the fibers 12, 14, or 16 will not cause scattering of light. Preferably stainless steel is used for the elements 10 and 11, since this material provides several advantages. First, it is opaque, so that stray light is not introduced into the optical system at the coupling. Second, it is mechanically strong and durable. Third, stainless steel tubing of precisely controlled inside and outside diameter is commercially available, as hypodermic syringe tubing. Fourth, stainless steel tubing is easily cold formed, so that a slight flare may be introduced into the elements 10 and 11 to assist in assembly. It should be noted that the elements 10 and 11 need not be as short in relation to fiber diameter as they are shown in FIGS. 1 and 2, but may alternatively be made longer, and with a slip fit clearance between the outside diameter of element 11 and the inside diameter of element 10, so that rapid assembly is facilitated while precise orientation is assured. The axes of all three fibers must be approximately parallel, and the axis of fiber 16 should preferably be positioned so that, if the axes of all three fibers were infinitely extended, the axis of fiber 16 would lie midway between the axes of fiber 14 and fiber 12. In the currently preferred embodiment 0.005" diameter polymethylmethacrylate (Dupont "Crofon" TM type) clad fibers are used, and epoxy glue is used to join the fibers 12, 14, and 16. This glue is itself very well index-matched to the fibers, and very little unnecessary attenuation through the coupler is incurred.

FIG. 2 shows the process of assembly of the coupler according to the present invention. First, fiber 16 is located in element 11, and fibers 12 and 14 are located in element 10. Note that the ends of fibers 12 and 14 must be approximately adjacent beyond the element 10. The cavity within element 10 is then filled with a transparent cement or glue which is approximately index-matched to the cores of the fibers 12, 14, and 16. The elements 10 and 11 are then fitted together, and the accompanying extrusion of glue assures that air bubbles (which would cause undesirable scattering of light) are not located between the ends of fiber 16 and of fibers 12 and 14. After the glue has dried, all elements are firmly retained in place, and a very durable optical coupling has been made.

If 0.005" fibers are used, the spacing between the end of fiber 16 and the ends of fibers 14 and 12 is preferably 7 mils or less. If the spacing is made larger, an increased amount of energy will be absorbed within the walls of the coupler 10. In any arrangement where one fiber is coupled to two, a 3 dB loss is inevitable. However, crucial factors in coupling design are dissipation within the coupling, and radiation of energy which is not coupled into an output fiber.

Since the interior of the elements 10 and 11 is, in the preferred embodiment, rough and light-absorbant, light radiated from a fiber end which strikes the inner surface of element 10, although not radiated into space, is still lost. The optimal maximum spacing for any materials and fiber dimensions, is determined as follows. Where $M_1$ is the index of refraction of each fiber core, $M_2$ is the index of fiber cladding, $M_3$ is the index of the material within the element 10, and $d$ is the fiber diameter, the maximum deviation $D_{max}$ of light launched from the end of a fiber, measured with respect to the fiber axis, is:

$$D_{max} = \arcsin\left\{ \frac{M_1}{M_3} \sin\left[ \arccos\left( \frac{M_2}{M_1} \right) \right] \right\}.$$

The maximum optimal gap spacing $X_{opt}$ is then:

$$X_{opt} \leq \frac{d}{2 \tan(D_{max})}.$$

A closer spacing may cause slightly greater loss, but in practice this is not a problem. However, gap spacings greater than $X_{opt}$ will cause significantly greater loss.

As will be obvious to those skilled in the art, a broad range of equivalents to and variations on the preferred embodiment discussed above is possible, and the scope of the inventive concepts discussed with reference to the principal preferred embodiment is explicitly not limited thereby. For example, it is not strictly necessary that fiber 16 be placed symmetrically with respect to fibers 12 and 14. If fiber 16 were slightly closer to one of the two fibers 12 and 14, performance would be slightly degraded, but the present invention would still have been applied. Similarly, a few degrees of misalignment of the fiber axes can also be tolerated.

What is claimed is:

1. A fiber optic coupler for coupling two mutually isolated fibers to a union fiber, comprising:
    a female element generally shaped as a cylindrical shell, said female element comprising an inside diameter which is equal to twice the diameter of one of said mutually isolated fibers, plus clearance; and
    a male element shaped generally as a cylindrical shell, said male element having an inside diameter which is equal to the diameter of said union fiber plus clearance, and said male element having an outside diameter which is approximately equal to the inside diameter of said female element.

2. The coupler of claim 1, wherein said male and female elements are opaque.

3. The coupler of claim 2, wherein said male and female elements each comprise stainless steel.

4. The coupler of claim 1, wherein said male element and said female element, each respectively comprise one flared end.

5. The coupler of claim 4, wherein both ends of said female element are flared.

6. A method for coupling two mutually isolated optical fibers to a union optical fiber, comprising the steps of:
providing a female element generally shaped as a cylindrical shell, said female element comprising an inside diameter which is equal to twice the diameter of one of said mutually isolated fibers, plus clearance;
providing a male element shaped generally as a cylindrical shell, said male element having an inside diameter which is equal to the diameter of said union fiber plus clearance, and said male element having an outside diameter which is approximately equal to the inside diameter of said female element;
positioning said union fiber within said male element so that a free end of said union fiber protrudes from said male element;
positioning said mutually isolated fibers within said female elements, so that respective free ends of said mutually isolated fibers protrude from said female element and are approximately adjacent;
filling said female element with tranlucent glue; and
assembling said male element into said female element so that said free end of said union fiber is opposed to said respective free ends of said mutually isolated fibers.

7. The method of claim 6, wherein said fibers comprise clad plastic fibers, and wherein said glue comprises epoxy glue.

8. The method of claim 6, wherein said assembling and positioning steps are performed such that the distance between said respective free ends of said respective fibers is $$X_{opt} \leq \frac{d}{2 \tan(D_{max})},$$

where $$D_{max} = \arcsin\left\{ \frac{M_1}{M_3} \sin\left[ \arccos\left( \frac{M_2}{M_1} \right) \right] \right\}$$

$M_1$ is the index of refraction of each of the core of each of said fibers, $M_2$ is the index of refraction of the cladding of each of said fibers, $M_3$ is the index of refraction of said glue, and d is said diameter of each of said fibers.

* * * * *